United States Patent
Biskeborn et al.

(10) Patent No.: US 8,444,865 B2
(45) Date of Patent: May 21, 2013

(54) MAGNETIC RECORDING HEAD COATING AND METHOD

(75) Inventors: Robert G. Biskeborn, Hollister, CA (US); Calvin S. Lo, Saratoga, CA (US); Gary M. Decad, Palo Alto, CA (US); Cherngye Hwang, San Jose, CA (US)

(73) Assignee: International Busines Machines Corporation, Armonk, NY (US)

(*) Notice: Subject to any disclaimer, the term of this patent is extended or adjusted under 35 U.S.C. 154(b) by 953 days.

(21) Appl. No.: 12/193,107

(22) Filed: Aug. 18, 2008

(65) Prior Publication Data
US 2010/0038340 A1 Feb. 18, 2010

(51) Int. Cl.
*G11B 5/3163* (2006.01)

(52) U.S. Cl.
USPC .................. 216/22; 216/13; 216/38; 360/317

(58) Field of Classification Search
USPC ............... 360/125.3, 123.02, 125.06, 125.71, 360/319, 123.4, 125.42, 125.43, 320, 125.58; 216/22, 38; 29/603.09, 603.1, 603.13, 603.15
See application file for complete search history.

(56) References Cited

U.S. PATENT DOCUMENTS

| | | | |
|---|---|---|---|
| 5,065,483 A | | 11/1991 | Zammit |
| 5,854,140 A | * | 12/1998 | Jaso et al. ...................... 438/740 |
| 6,099,393 A | * | 8/2000 | Katagiri et al. .................. 451/56 |
| 6,131,271 A | * | 10/2000 | Fontana et al. ............. 29/603.14 |
| 6,315,875 B1 | * | 11/2001 | Sasaki ....................... 204/192.34 |
| 6,320,725 B1 | * | 11/2001 | Payne et al. .............. 360/125.02 |
| 6,348,395 B1 | * | 2/2002 | Clevenger et al. ............ 438/424 |
| 6,392,840 B1 | * | 5/2002 | Chen ......................... 360/123.39 |
| 6,628,484 B2 | | 9/2003 | Werner |
| 6,759,084 B1 | | 7/2004 | Ju et al. |
| 2002/0027751 A1 | * | 3/2002 | Shimazawa et al. .......... 360/320 |
| 2002/0084243 A1 | * | 7/2002 | Hsiao et al. ...................... 216/13 |
| 2004/0218413 A1 | * | 11/2004 | Ishidao et al. ................. 365/103 |
| 2004/0235201 A1 | * | 11/2004 | Albert et al. ....................... 438/3 |
| 2005/0264949 A1 | | 12/2005 | Gao et al. |
| 2006/0232883 A1 | * | 10/2006 | Biskeborn et al. ............ 360/129 |
| 2007/0242393 A1 | | 10/2007 | Gao et al. |

* cited by examiner

*Primary Examiner* — Duy Deo
*Assistant Examiner* — Erin Bergner
(74) *Attorney, Agent, or Firm* — Suiter Swantz pc llo

(57) ABSTRACT

A method for encapsulating a magnetic recording head including coating at least a portion of a magnetic recording head containing a recording gap with a first layer of at least one coating material, including silicon nitride, the first layer of at least one coating material having a first removal rate, coating at least a portion of the magnetic recording head containing a recording gap and coated with the first layer of at least one coating material with a second layer of at least one coating material, including aluminum oxide, the second layer of at least one coating material having a second removal rate higher than the first removal rate, and removing at least a portion of the second layer of at least one coating material via a removal process, including chemical-mechanical polishing, lapping, or vacuum processing to at least partially planarize the surface of the recording gap.

18 Claims, 4 Drawing Sheets

MAGNETIC RECORDING HEAD COATING AND METHOD

TECHNICAL FIELD

The present disclosure generally relates to the field of magnetic recording devices, and more particularly to a method for encapsulating a magnetic recording head.

BACKGROUND

Magnetic storage is one of the most widely used technologies in the storage of electronic, audio, and video data. A common example of a system based on magnetic storage is the computer hard disk. Another example of a magnetic storage system is the tape drive. Data is written to a magnetic medium using a write head, and may be accessed using a magnetic read head.

SUMMARY

The present disclosure is directed to a method for encapsulating a magnetic recording head including, but not limited to, coating at least a portion of a magnetic recording head containing a recording gap with a first layer of at least one coating material, including silicon nitride, the first layer of at least one coating material having a first removal rate; coating at least a portion of the magnetic recording head containing a recording gap and coated with the first layer of at least one coating material with a second layer of at least one coating material, including aluminum oxide, the second layer of at least one coating material having a second removal rate higher than the first removal rate; removing at least a portion of the second layer of at least one coating material via a removal process, including chemical-mechanical polishing, lapping, or vacuum processing to at least partially planarize the surface of the recording gap.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
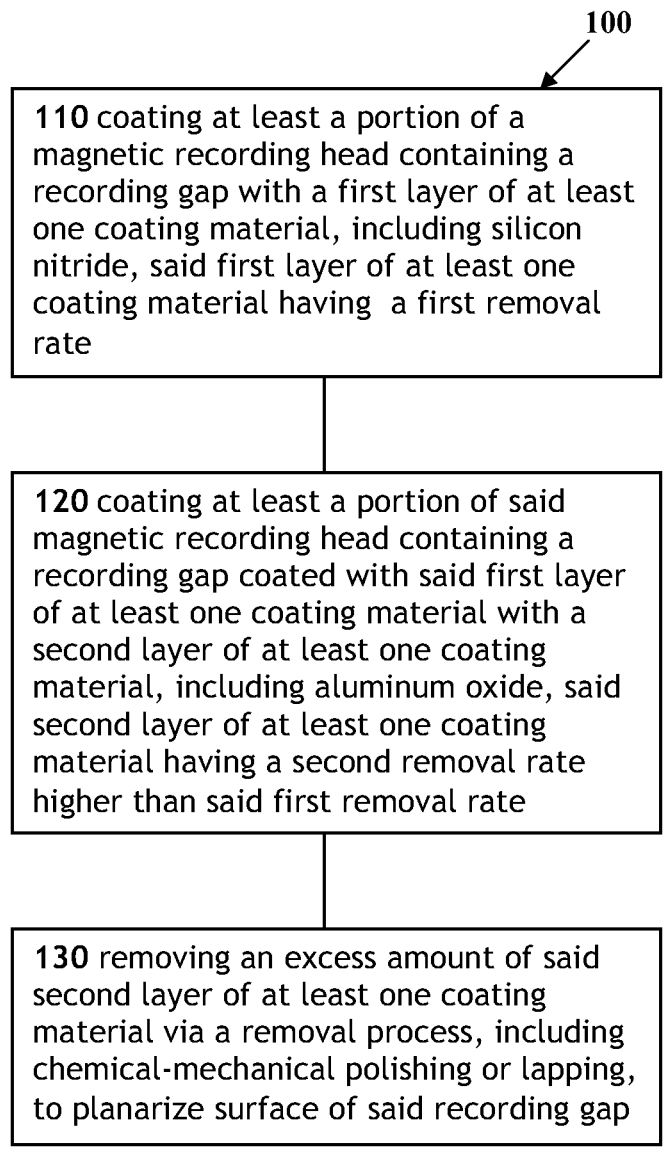
FIG. 1 is a flow diagram of the method for encapsulating a magnetic recording head.

Referring to FIG. 1, a method 100 for encapsulating a magnetic recording head is described. At step 110, the method 100 coats at least a portion of a magnetic recording head containing a recording gap with a first layer of at least one coating material, including silicon nitride, the first layer of at least one coating material having a first removal rate. At step 120, the method 100 coats at least a portion of the magnetic recording head containing a recording gap and coated with the first layer of at least one coating material with a second layer of at least one coating material, including aluminum oxide, the second layer of at least one coating material having a second removal rate higher than the first removal rate. At step 130, the method 100 removes at least a portion of the second layer of coating material via a removal process, including chemical-mechanical polishing, to at least partially planarize the surface of the recording gap.

Figure 2:
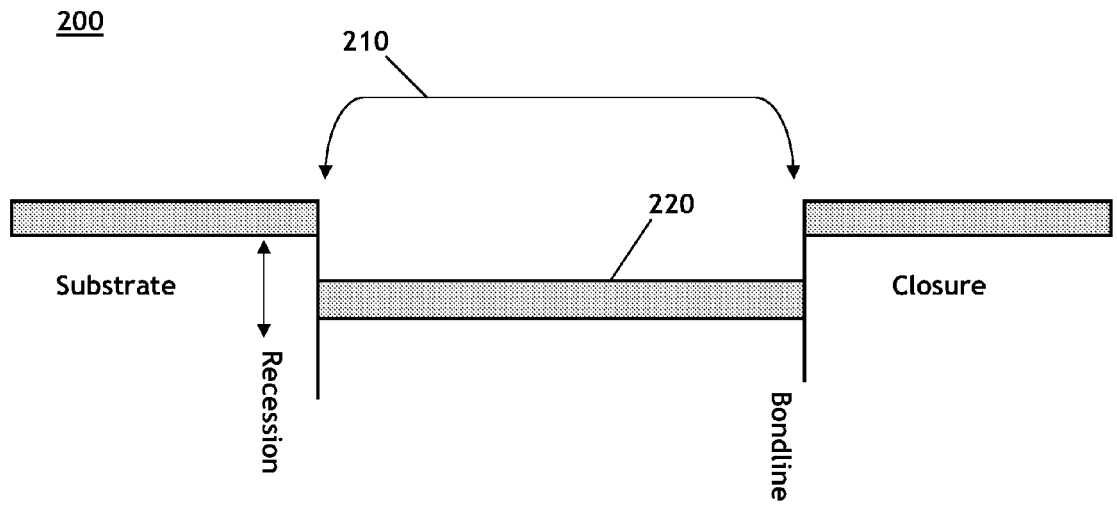
FIG. 2 is a diagram illustrating a magnetic recording head containing a recording gap and coated with a first layer of coating material.

Referring to FIG. 2, a diagram 200 illustrating a magnetic recording head containing a recording gap 210 and coated with a first layer of coating material 220 in accordance with an exemplary embodiment of the present invention is shown. The recording gap 210 contained in the magnetic recording head may be recessed prior to coating at least a portion of the head with the first layer of material 220. For example, the recording gap 210 may be recessed using ion-milling, plasma sputtering, reactive-ion etching, or lapping. The first layer of coating material has a first removal rate that is lower than subsequent layers of coating materials, enabling the first layer of coating material to retard the chemical-mechanical polishing, lapping, or vacuum processing at the first layer and thus prevent overlapping of the underlying substrate. Further, the material used to form the first layer of coating material 220 may include a material with known better adhesion to the recording gap material than the material used to form the second layer of coating material 310. For example, the first layer of coating material 220 may include silicon nitride, boron nitride, silicon carbide, or DLC.

Figure 3:
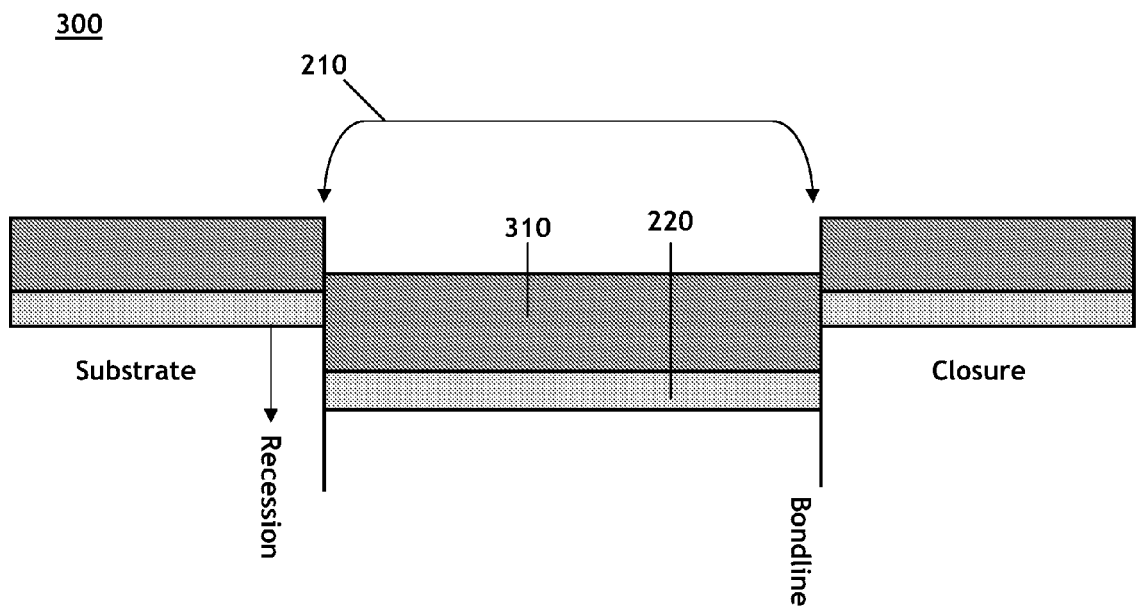
FIG. 3 is a diagram illustrating a magnetic recording head containing a recording gap and coated with a first layer of coating material and a second layer of coating material.

Referring to FIG. 3, a diagram 300 illustrating a magnetic recording head containing a recording gap 210 coated with a first layer of coating material 220 and a second layer of coating material 310 in accordance with an exemplary embodiment of the present invention is shown. The second layer of coating material 310 has a second removal rate that is higher than the first layer of coating material 220. For example, the material used to form the second layer of coating material 310 may include aluminum oxide. Further, the first layer of coating material may have a thickness that is greater than the depth of the recording gap.

Figure 4:
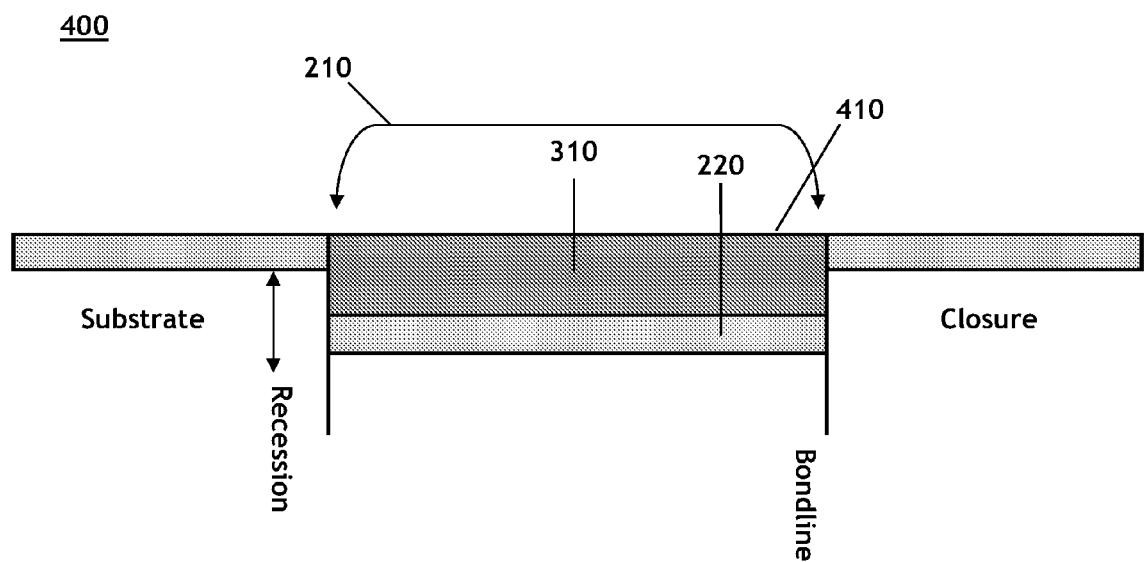
FIG. 4 is a diagram illustrating the surface of the recording gap partially planarized by removal of at least a portion of the second layer of coating material.

Referring to FIG. 4, a diagram 400 illustrating the surface 410 of the recording gap 210 at least partially planarized by removal of at least a portion of the second layer of coating material 310 in accordance with an exemplary embodiment of the present invention is shown. For example, the surface of the recording gap may be planarized by removing at least a portion of the second layer of coating material using chemical-mechanical polishing, lapping, or vacuum processing.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for encapsulating a magnetic recording head, comprising:
   providing a magnetic recording head, said magnetic recording head including a recording gap;
   recessing the recording gap of the magnetic recording head via ion-milling, plasma sputtering, reactive-ion etching, or lapping;
   coating at least a portion of the magnetic recording head, said portion including the recording gap and a portion of the magnetic head surrounding the recording gap, with a first layer of at least one coating material, including silicon nitride, said first layer having a thickness greater than a depth of the recording gap;
   coating over said first layer with a second layer of at least one coating material, including aluminum oxide; and
   removing at least a portion of said second layer and at least a portion of said first layer via lapping or vacuum processing to at least partially planarize the surface of said recording gap, wherein a removal rate for said second layer is greater than a removal rate for said first layer.

2. The method of claim 1, wherein the step of removing comprises lapping.

3. The method of claim 1, wherein the step of removing comprises vacuum processing.

4. A method for encapsulating a magnetic recording head, comprising:
   providing a magnetic recording head, said magnetic recording head including a recording gap;
   recessing the recording gap of the magnetic recording head via ion-milling, plasma sputtering, reactive-ion etching, or lapping;
   coating at least a portion of the magnetic recording head, said portion including the recording gap and a portion of the magnetic head surrounding the recording gap, with a first layer of at least one coating material, including boron nitride, silicon carbide, or DLC, said first layer having a thickness greater than a depth of the recording gap;
   coating over said first layer with a second layer of at least one coating material, including aluminum oxide; and
   removing at least a portion of said second layer and at least a portion of said first layer via chemical-mechanical polishing, lapping, or vacuum processing to at least partially planarize the surface of said recording gap, wherein a removal rate for said second layer is greater than a removal rate for said first layer.

5. The method of claim 4, wherein the first layer includes boron nitride.

6. The method of claim 5, wherein the step of removing comprises lapping.

7. The method of claim 5, wherein the step of removing comprises vacuum processing.

8. The method of claim 5, wherein the step of removing comprises chemical-mechanical polishing.

9. The method of claim 4, wherein the first layer includes silicon carbide.

10. The method of claim 9, wherein the step of removing comprises lapping.

11. The method of claim 9, wherein the step of removing comprises vacuum processing.

12. The method of claim 9, wherein the step of removing comprises chemical-mechanical polishing.

13. The method of claim 4, wherein the first layer includes DLC.

14. The method of claim 13, wherein the step of removing comprises lapping.

15. The method of claim 13, wherein the step of removing comprises vacuum processing.

16. The method of claim 13, wherein the step of removing comprises chemical-mechanical polishing.

17. The method of claim 1, wherein the at least one coating material of said first layer is more adhesive to the recording gap than the at least one coating material of said second layer.

18. The method of claim 4, wherein the at least one coating material of said first layer is more adhesive to the recording gap than the at least one coating material of said second layer.

* * * * *